United States Patent [19]

Yanagida

[11] 4,385,334

[45] May 24, 1983

[54] VERTICAL MAGNETIC RECORDING AND REPRODUCING HEAD AND A METHOD FOR MANUFACTURING THE HEAD

[75] Inventor: Tuneo Yanagida, Hino, Japan

[73] Assignee: Olympus Optical Co., Ltd., Tokyo, Japan

[21] Appl. No.: 168,281

[22] Filed: Jul. 10, 1980

[30] Foreign Application Priority Data

Jul. 18, 1979 [JP] Japan .................................. 54-91377

[51] Int. Cl.³ .......................... G11B 5/12; G11B 5/20; G11B 5/22
[52] U.S. Cl. .................................. 360/125; 360/113; 360/123
[58] Field of Search ................. 360/125, 113, 121–123, 360/119, 126–127

[56] References Cited

U.S. PATENT DOCUMENTS 3,921,217 11/1975 Thompson .......................... 360/113
4,222,084 9/1980 Nakagawa et al. ................. 360/125
4,255,772 3/1981 Perez et al. .......................... 360/113
4,286,299 8/1981 Shirahata et al. .................... 360/113

FOREIGN PATENT DOCUMENTS 51-134706 5/1976 Japan .

Primary Examiner—Alfred H. Eddleman
Attorney, Agent, or Firm—Frishauf, Holtz, Goodman and Woodward

[57] ABSTRACT

A vertical magnetic recording and reproducing head includes a magnetic sensing element for sensing a magnetized pattern recorded in a recording medium which serves as a main magnetic electrode in the reproduction mode, a bias section for biasing the magnetic sensing element, and a main magnetic pole which is disposed adjacent to said magnetic sensing element. The main magnetic pole includes a magnetic member serving as the main magnetic pole for magnetizing the recording medium in the record mode.

8 Claims, 39 Drawing Figures

F I G. 4
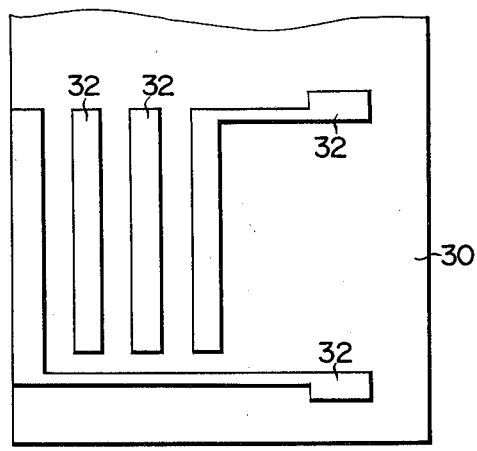
(a)
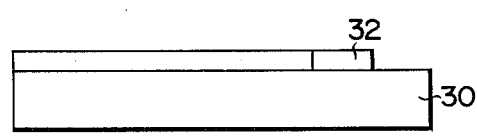
(b)
F I G. 5
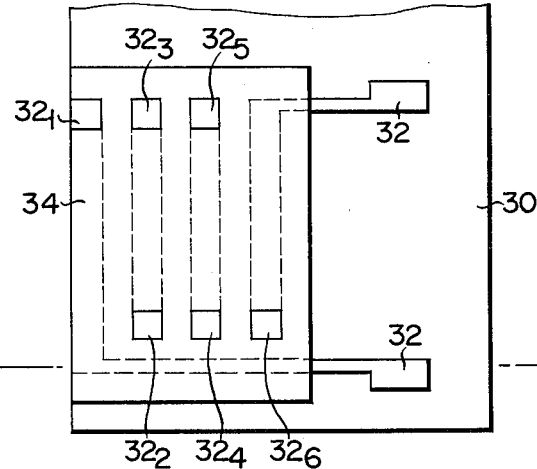
(a)
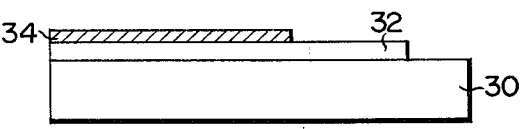
(b)

VERTICAL MAGNETIC RECORDING AND REPRODUCING HEAD AND A METHOD FOR MANUFACTURING THE HEAD

BACKGROUND OF THE INVENTION

The present invention relates to a record/reproduction head applicable for a vertical magnetic recording system.

A vertical magnetic recording system, which is well adaptable for a high density recording system, has been known. The recording system employs a magnetizing pattern orthogonal to the magnetic surface of a magnetic tape as a recording medium. In harmony with the magnetizing pattern, the orientation of the magnetic material of the magnetic tape used is orthogonal to the magnetic surface of the tape. The use of such magnetizing pattern effectively reduces the demagnetization during the course of information recording. Therefore, the vertical magnetic recording system remarkably improves the frequency response, compared to an usual magnetic recording system (in-surface recording system) which employs a horizontal magnetizing pattern with respect to the magnetizing surface direction. Thus, the vertical recording system is essentially suited for high density recording, in comparison with the conventional in-surface recording system.

The above-mentioned recording system and a recording head used for the vertical magnetic recording system are disclosed in Japanses Patent Disclosure No. 134706/77. The disclosure describes that the auxiliary magnetic pole exciting type head shown in FIG. 3(c) is preferable from the view points of recording efficiency and recording density. The magnetic pole for magnetizing the magnetic medium in combination with the auxiliary magnetic pole exciting type head, that is a main magnetic pole, is made of a permalloy layer of 10 $\mu$m or less in thickness. The thickness of the main magnetic pole is usually selected to be 2 to 3 $\mu$m in order to magnetically-saturate the recording medium and obtain a good recording efficiency.

When the recording head is used as a reproducing head, however, it can not fully utilize the useful feature of the vertical magnetic recording system, that is, the high density recording characteristic, because the reproduction resolution (high frequency response) is poor. This follows from the fact that the reproduction resolution is restricted by the thickness of the main magnetic pole. When the effective thickness of the main magnetic pole is 3 $\mu$m, for example, the information recorded on the area of the magnetic recording medium, which extends with a width of 3 $\mu$m or less in the tape traveling direction, can not be reproduced. The magnetic head of the above-mentioned disclosure, which is shown in FIG. 3(c), indirectly detects by the exciting coil of the auxiliary magnetic pole a change of the magnetic flux sensed by the main magnetic pole. Therefore, the reproduction sensitivity of the head is inferior.

It is for this reason that the conventional vertical magnetic recording system employs the auxiliary magnetic pole exciting head for the recording head and the usual ring-like head for the reproduction head. The ring-like reproduction head has at most about 1 $\mu$m of the effective gap width due to the restriction on the machining technique. Because of this, the conventional vertical recording system fails to fully utilize the high density recording characteristic thereof. In the case of using individually the recording head and the reproduction head for the respective purposes, the azimuth of the recording head must be coincident with that of the reproduction head. In other words, an arrangement inherently requires an azimuth adjustment. As the recording density becomes higher, the azimuth adjustment becomes more critical. This means that the azimuth adjustment is difficult for high density recording. Further, if the azimuths of the recording head and the reproduction head, when those are used, are different, the resolution of the record/reproduction is deteriorated without fail.

SUMMARY OF THE INVENTION

Accordingly, an object of the present invention is to provide a record/reproduction head which can make the best use of the high density recording characteristic in the vertical magnetic recording system and is free from losing the azimuth coincident kept between the record and the reproduction, and to provide a method for manufacturing the record/reproduction head, and a record/reproduction system using the record/reproduction head.

The record/reproduction head according to the present invention is characterized by a magnetic sensing element (14) serving as a main magnetic pole in the reproduction mode, and magnetic members (18 and 20) serving as a main magnetic pole in the record mode. In the reproduction mode, the magnetic sensing element senses a magnetizing pattern in an extremely narrow range (L1) of the record medium ($10_2$). Therefore, a high degree of reproduction resolution can be obtained. In the record mode, the magnetic members, or the magnetic members and the magnetic sensing element, cooperate, to form the main magnetic pole. The main magnetic pole has an equivalently wide width (L2). In other words, the main magnetic pole can treat a larger magnetic flux in the record mode than in the reproduction mode. As a result, a high density recording is made at a sufficiently high level.

BRIEF DESCRIPTION OF THE DRAWINGS

FIGS. 4 through 18 illustrate a process of manufacturing a main magnetic pole 24 of the head having the construction corresponding to that shown in FIG. 1, in which (a) illustrates a top view of the head and (b) a side view;

DETAILED DESCRIPTION OF THE PREFERRED EMBODIMENTS

A record/reproduction head, its manufacturing method, and a record/reproduction system using the head will be described in detail referring to the accompanying drawings. For simplicity of explanation and illustration, like reference symbols are used to designate like or equivalent portions in several drawings.

Figure 1:
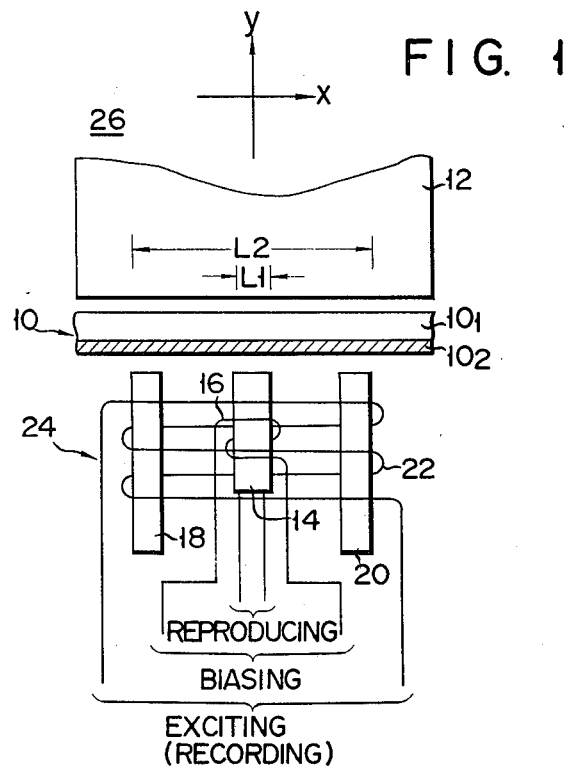
FIG. 1 is a schematic diagram of a record/reproduction head according to an embodiment of the present invention.

FIG. 1 schematically illustrates a relative arrangement of a record/reproduction head to a recording medium, or a magnetic tape. A base $10_1$ made of a polyester film or the like is uniformly coated with a magnetic medium $10_2$ as a high Hc magnetic film of Co-Cr group with an anisotropy of vertical magnetism or a magnetic medium $10_2$ as a double layered magnetic film having the lower layer with a low Hc but a high $\mu$ of Fe-Ni group and the upper layer of Co-Cr group. Disposed on the base $10_1$ side of the magnetic tape 10 thus constructed is an auxiliary magnetic pole 12 made of permalloy or ferrite. A thin film resistive element (MR element) 14 is disposed in opposition to the auxiliary magnetic pole 12. The MR element is not the subject matter of the present invention and no detail of it will be given here. The detail of the MR element is discussed in "Nikkei Electronics" published in Japan, Mar. 22, 1976, pp 101 to 125. The thin film magnetic head is discussed in the same journal, July 25, 1977, pp 131 to 146.

The MR element 14 is wound with a bias coil 16 for providing a bias magnetic field. When biased by the bias coil 16, the MR element 14 is in a normal magnetic sensible state. In other words, when the magnetic flux corresponding to a magnetizing pattern recorded is applied from the magnetic medium $10_2$ of the tape 10 to the biased MR element 14, the element 14 produces a reproduction signal with an amplitude corresponding to the flux. In order to improve the reproduction resolution, the thickness L1 of the MR element 14 is selected to be approximately 0.3 $\mu$m, for example. Though the MR element 14 is made of soft magnetic material of Fe-Ni, for example, the MR element 14 is thus extremely thin and it is difficult to magnetize the magnetic medium $10_2$ to the saturation level. For improving the recording performance, magnetic members 18 and 20 made of, such as permalloy, are disposed on both sides of the MR element 14. Those magnetic members 18 and 20 are wound with an exciting coil 22 for providing a recording magnetic field.

The distance L2 between the magnetic members 18 and 20 corresponds to the effective thickness of the main magnetic pole 24 for recording. The magnetic members 18 and 20, and the MR element 14 are assembled into an unit thereby to form the main pole 24. The distance L2, or the thickness of the main magnetic pole 24, is selected to be about 3 $\mu$m, for example. If the effective thickness of the main magnetic pole 24 is on the order of a few or several $\mu$m, it is possible to magnetize the magnetic member $10_2$ at a sufficient large level, although it depends on the coercive force Hc of the magnetic member $10_2$ and its coating thickness.

Those components 12 to 24 constitute an example of the record/reproduction head 26 according to the invention.

As seen from the foregoing description, in the head 26, the thickness of the main magnetic pole 24 in the record mode is different from that in the reproduction mode. Specifically, the effective thickness of the main magnetic pole 24 is the wide width L2 in the record mode, while it is the narrow width L1 in the reproduction mode. Further, in the reproduction mode, the magnetic members 18 and 20 on both sides of the MR element 14 also serve as a shield member for the MR element 14. In other words, the magnetic members 18 and 20 improve the S/N ratio in the reproduction mode, and further the reproduction resolution. The fluxes developed from the magnetizing patterns located in the vicinity of the portions in face of the magnetic members 18 and 20, which the magnetic patterns are recorded in the magnetic medium $10_2$, are absorbed by the magnetic members 18 and 20. Accordingly, an amount of the magnetic flux entering the MR element 14, which the magnetic flux is not developed from the magnetic medium $10_2$ at the portion in face of the MR element 14, is remarkably reduced. The result is the improvement of the reproduction resolution.

Figure 2:
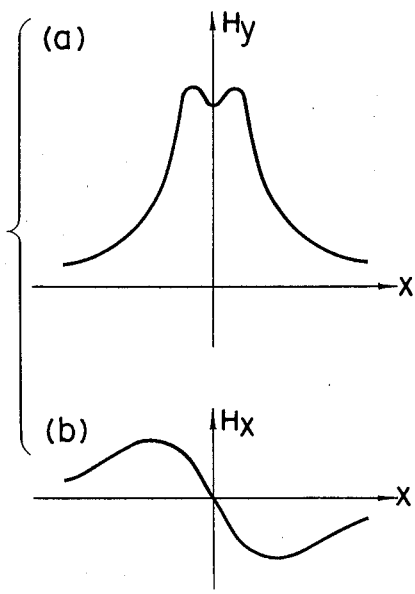
FIG. 2, consisting of (a) and (b), shows a distribution of a recording magnetic field developed by the head shown in FIG. 1.

FIG. 2(a) is a distribution of the recording magnetic field Hy developed by the head 26 shown in FIG. 1. As seen from the graph, the head 26 may provide an intensive recording magnetic field in the vertical direction (y direction) of the tape 10. A twin peaks of the magnetic field Hy arises from the fact that the magnetic members 18 and 20 are separated from the MR element 14. FIG. 2(b) illustrates the distribution of the recording magnetic field Hy shown in FIG. 2(a) by a magnetic field Hx in the tape running direction (x direction).

Figure 3:
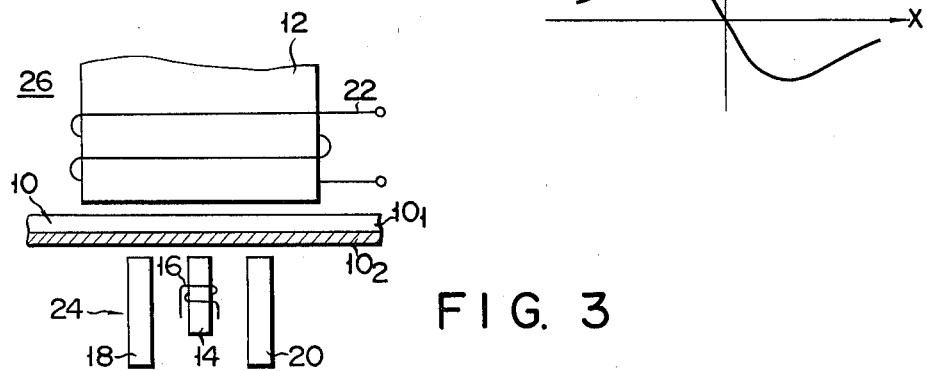
FIG. 3 shows a schematic diagram of a modification of the head shown in FIG. 1.

FIG. 3 is a construction of the record/reproduction head when the exciting coil 22 is provided at the auxiliary magnetic pole 12. The record/reproduction head 26 with the construction shown in FIG. 3 may provide the recording magnetic fields as shown in FIGS. 2(a) and (b), like the head 26 shown in FIG. 1. The head 26 as shown in FIG. 3 may provide a more intensive magnetic field than the head shown in FIG. 1. Accordingly, the head 26 shown in FIG. 3 is suitable for the recording information into the magnetic medium $10_2$ using high Hc material such as Co-Cr group. When the magnetic medium $10_2$ is made of low Hc material, e.g. Fe-Ni group, information may be recorded by using even the main magnetic pole 24 shown in FIG. 1. The head 26 shown in FIG. 1 is more practical in that the exciting coil 22 and the main magnetic pole 24 may be fabricated into a single body.

A manufacturing process of the record/reproduction head 26 as shown in FIG. 1 will subsequently be described referring to FIGS. 4 to 18. In those figures, (a) designates a top view of the head and (b) a side view of the same. It should be expressly understood that the structures shown in the accompanying drawings are exaggeratedly depicted in the shape and size, for ease of illustration.

In FIG. 4, an exciting coil pattern 32 corresponding to the exciting coil 22 is formed on a non-magnetic insulating substrate 30. Ceramic, non-magnetic ferrite or the like is used for the substrate 20 and Au (gold) for the pattern 32. The pattern 32 is formed on the substrate 30 by evaporation, spattering or the like.

At the next step, an oxide insulating layer 34 such as $SiO_2$ is formed so as to cover the major portion of the pattern 32, as shown in FIG. 5. The formation of the insulating layer 34 is performed by evaporation, spattering or the like, after masking the edge portions $32_1$ to $32_6$ of the pattern 32.

Figure 6:
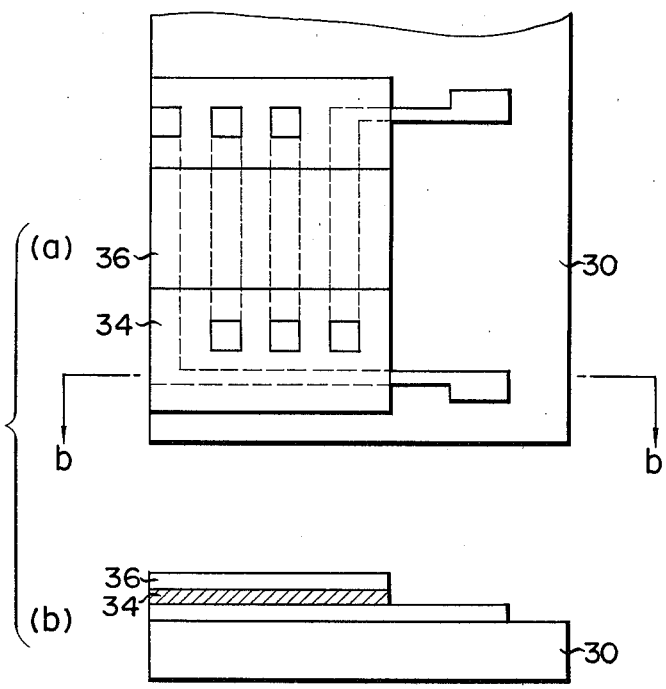

As shown in FIG. 6, a soft magnetic member 36 for shielding to serve as one part of the main magnetic pole in the record mode, is formed on the central part of the insulating layer 34 by evaporation, spattering of other like method. The magnetic member 36, corresponding to the magnetic member 18 or 20 shown in FIG. 1, is made of permalloy, for example.

Figure 7:
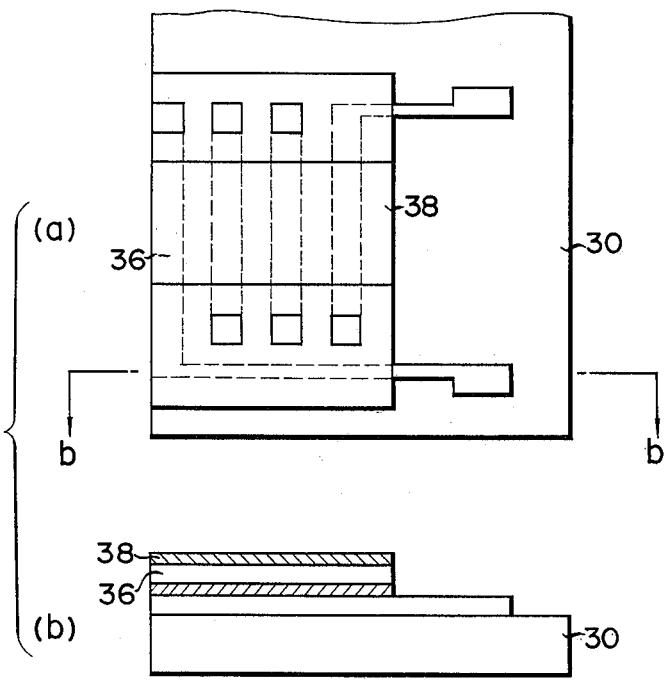

Then, an insulating layer 38 of SiO2, for example, is formed so as to cover the magnetic member 36, as shown in FIG. 7. Also in this case, evaporation, spattering or the like is used for forming the insulating layer 38.

Figure 8:
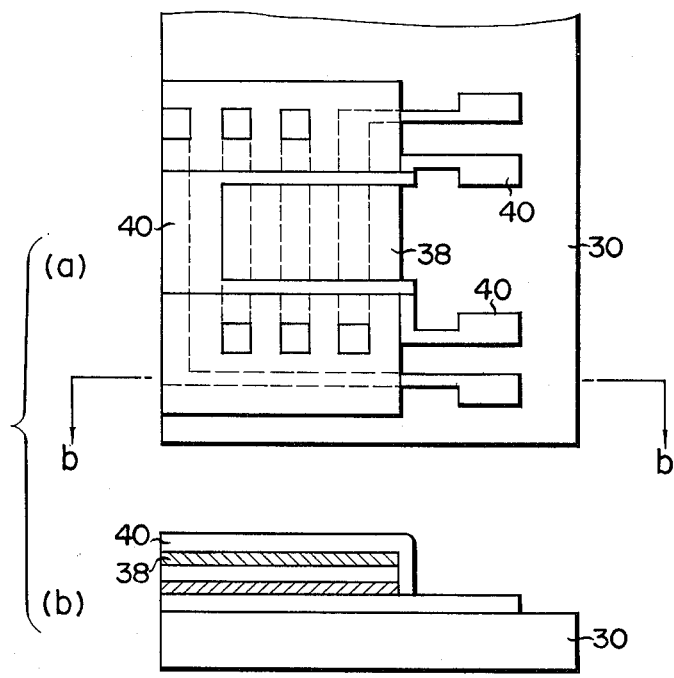

Then, shown in FIG. 8, a bias coil pattern 40 for applying the bias magnetic field is formed on the insulating layer 38 by a suitable method such as spattering, etc. The pattern 40, corresponding to the bias coil 16 shown in FIG. 1, is made of Au, for example.

Figure 9:
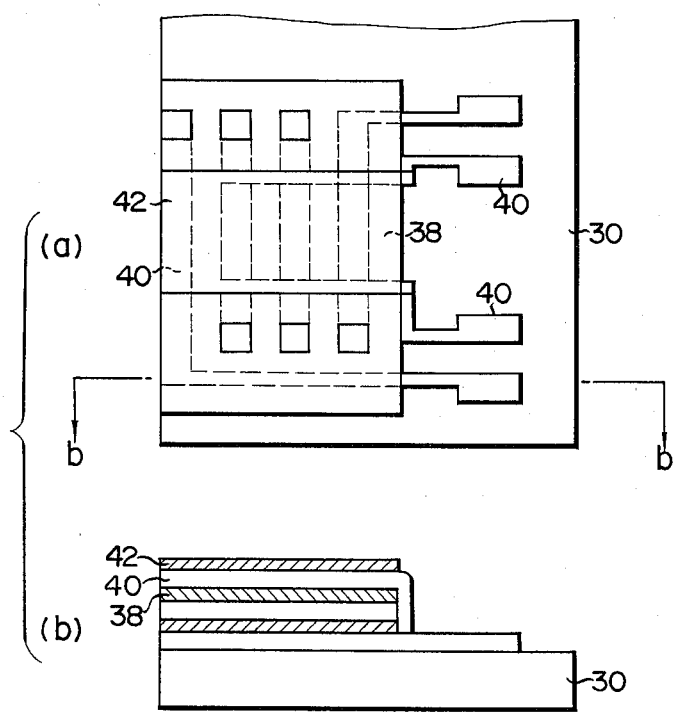

In the step of the manufacturing process shown in FIG. 9, an insulating layer 42 such as SiO2 is formed so as to cover the insulating layer 38 and the pattern 40 layered thereon by a suitable method, for example, by spattering.

Figure 10:
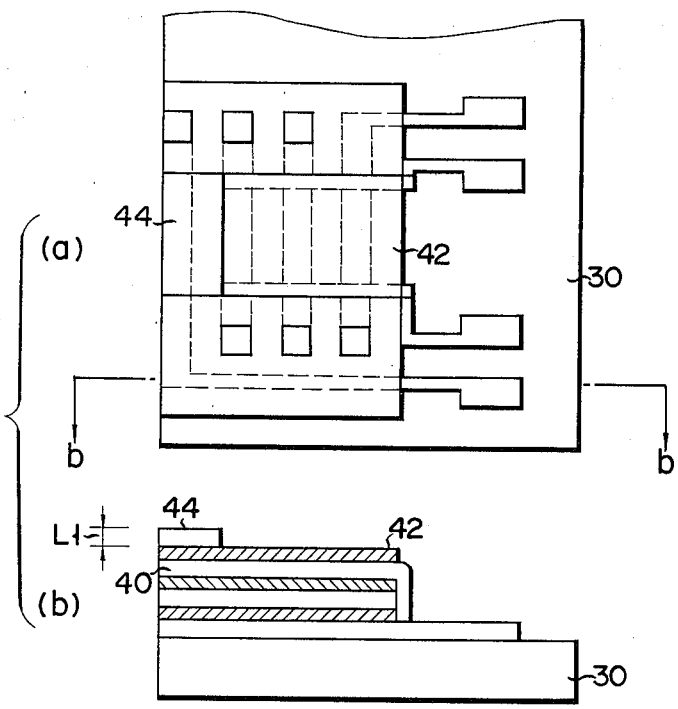

As shown in FIG. 10, a thin film MR element 44 is formed on the left end of the insulating layer 42. This formation may be made in the above-mentioned manner. The film thickness L1 of the MR element 44 corresponds to the thickness L1 shown in FIG. 1.

Figure 11:
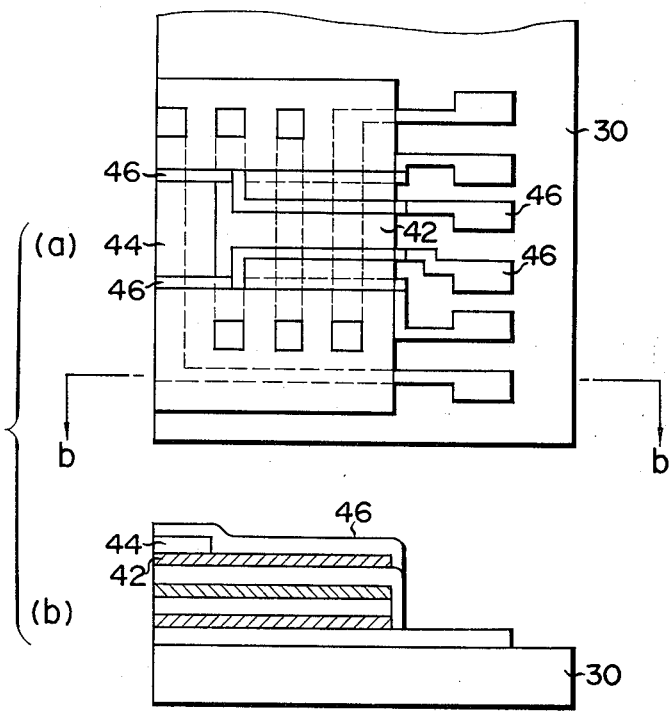

As shown in FIG. 11, two electro-conductive patterns 46 for signal output are formed on the insulating layer 42 and the MR element 44. The formation of these patterns 46 may also be performed by, e.g., spattering or evaporation of Au.

Figure 12:
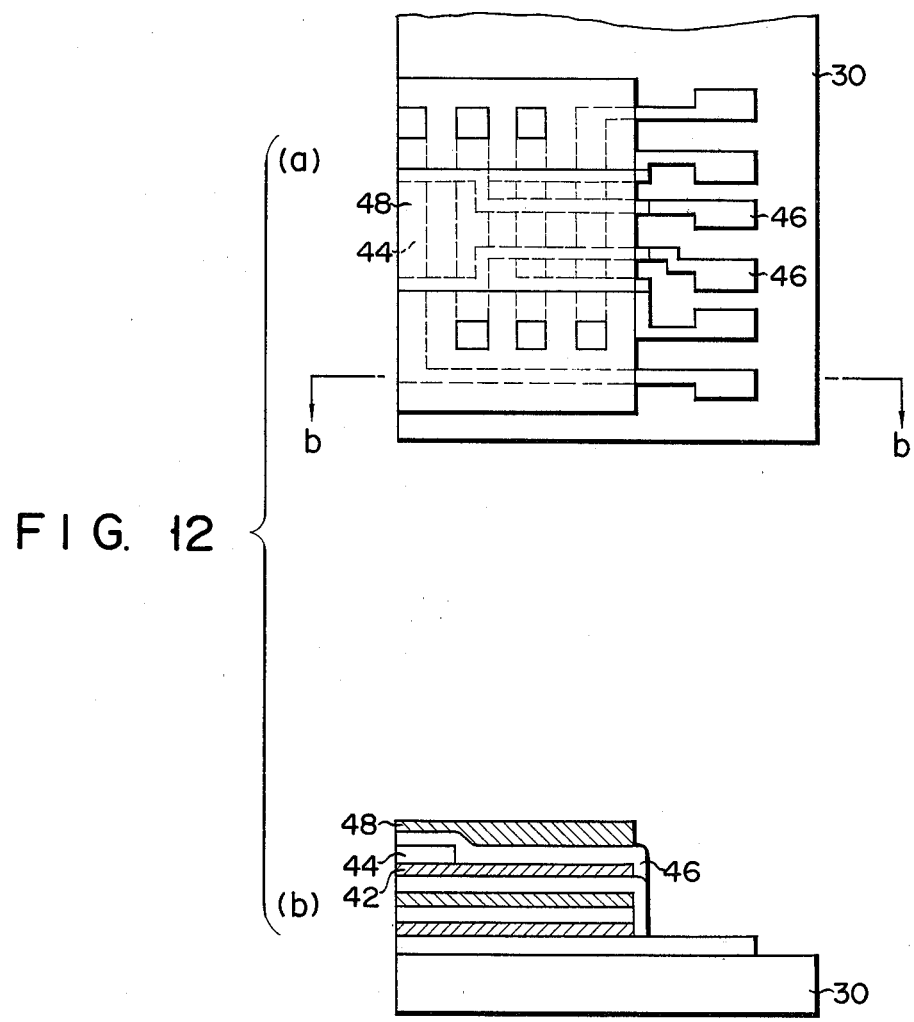

As shown in FIG. 12, an insulating layer 48 such as SiO2 is formed so as to cover the insulating layer 42, the MR element 44 and the two patterns 46. This formation may be carried out by a proper method such as spattering or the like.

Figure 13:
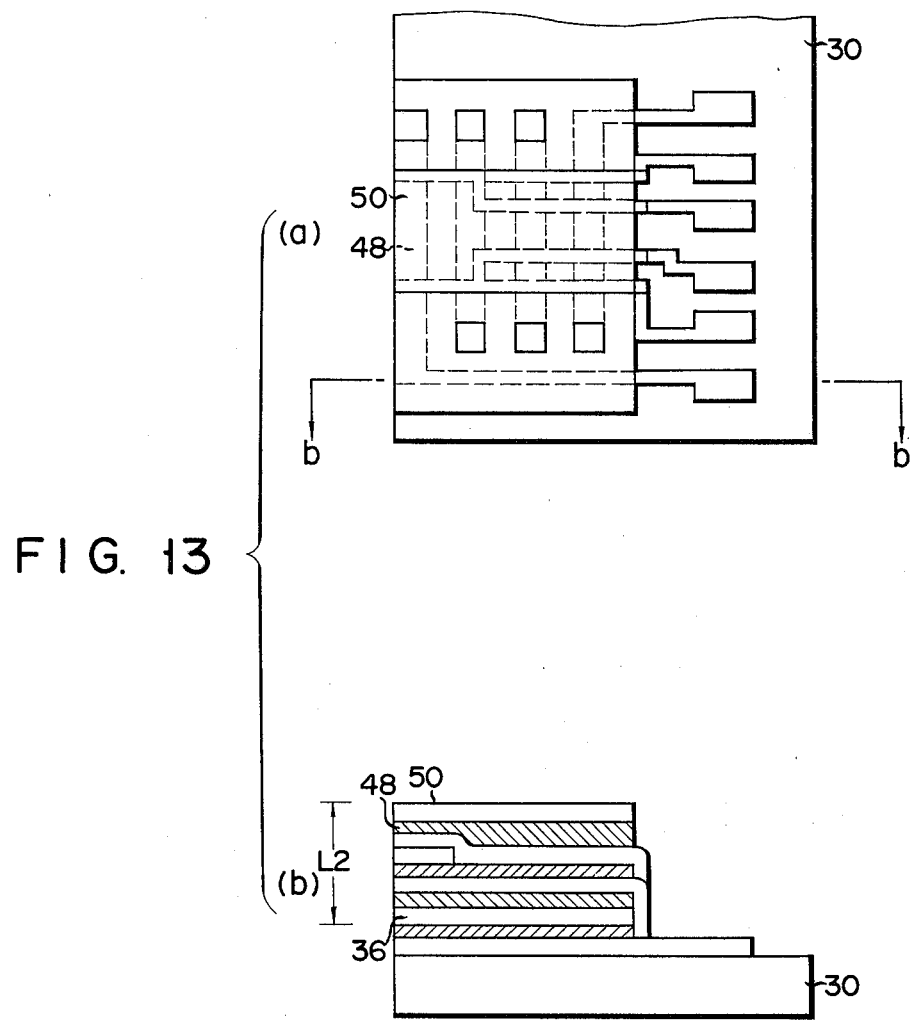

As shown in FIG. 13, a soft magnetic member 50 for shielding, which is the other part of the main magnetic pole for recording, is formed on the insulting layer 48 by spattering, etc. The magnetic member 50 corresponds to the magnetic member 20 or 18 shown in FIG. 1. The material for this is permalloy, for example, as in the case of the magnetic member 36. The distance L2 from the magnetic member 36 to the magnetic member 50 corresponds to the interval L2 shown in FIG. 1.

Figure 14:
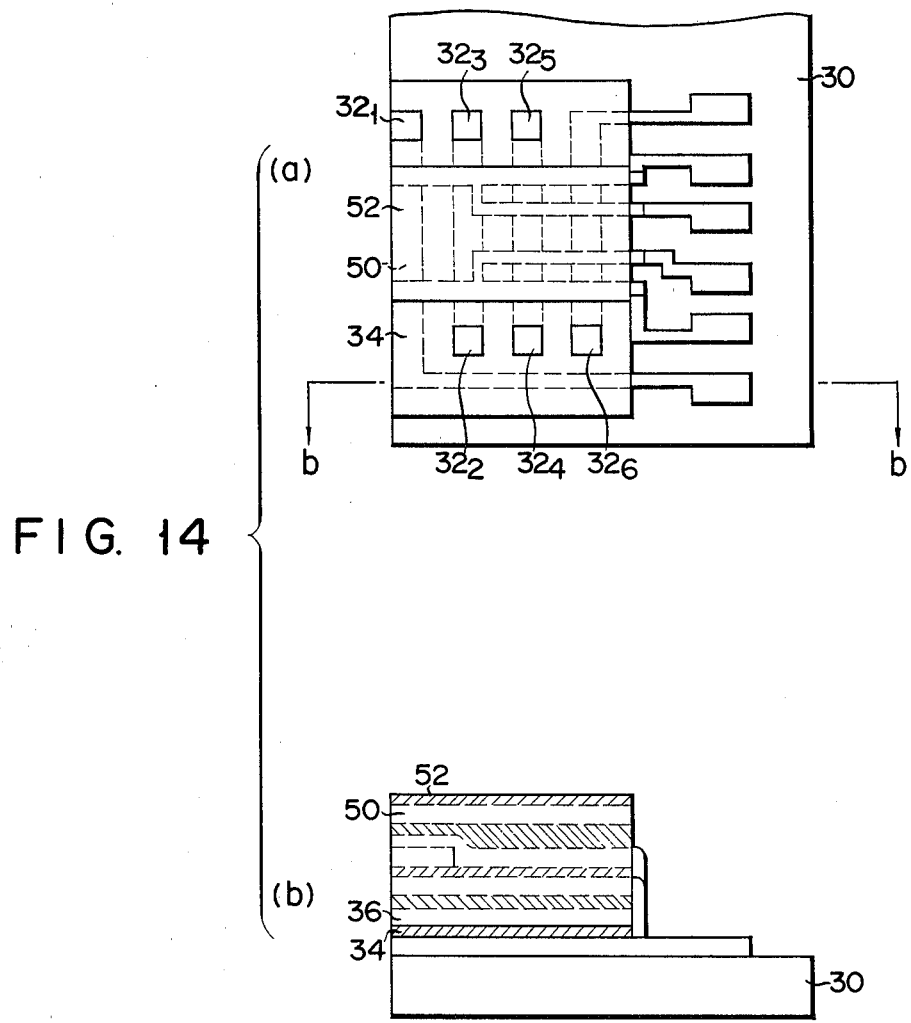

As shown in FIG. 14, the insulating layer 52 such as SiO2 is formed by the above-mentioned manner from above of the magnetic member 50, as shown in FIG. 14. At this time, the side surface of the stack of those layers 36 to 50 may also be covered with SiO2, if necessary.

Figure 15:
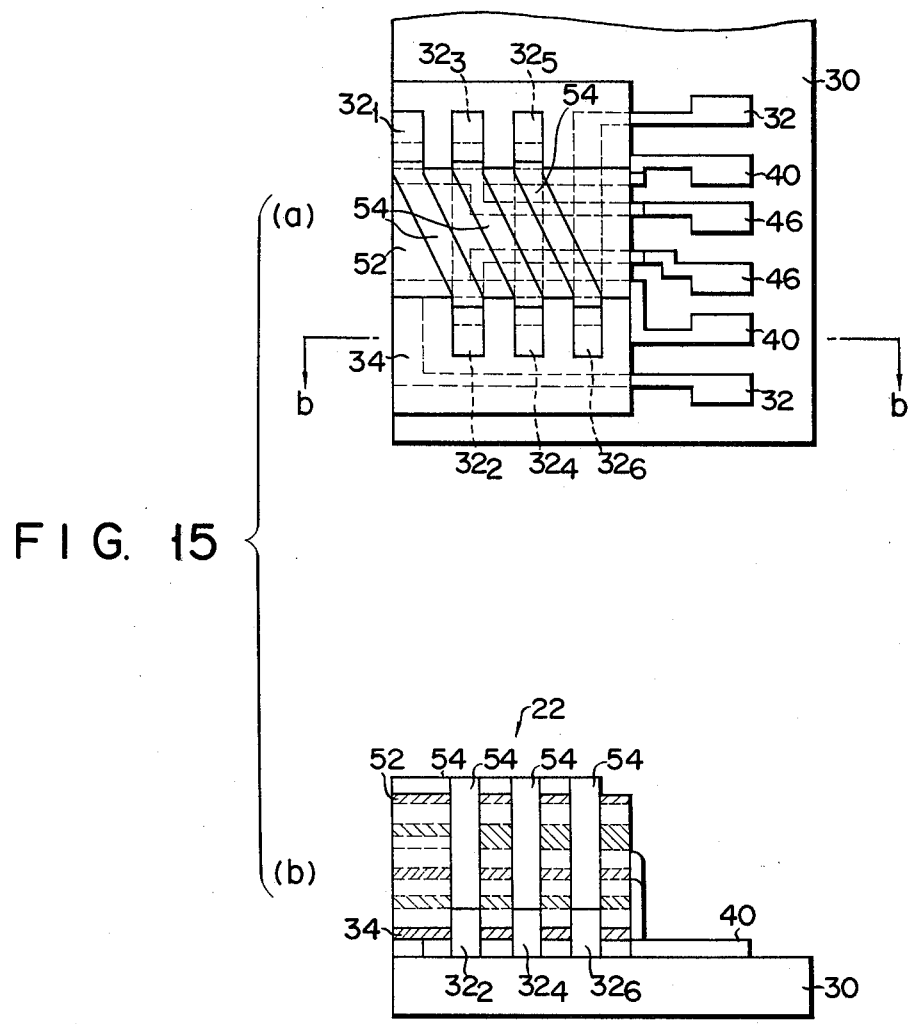

The next step shown in FIG. 15 forms a conductive pattern 54 connecting the edges $31_1$ and $32_2$, $32_3$ and $32_4$, and $32_5$ and $32_6$. In other words, the edges $32_1$, $32_3$ and $32_5$ are respectively connected to the edges $32_2$, $32_4$ and $32_6$ by means of the patterns 54 which bridge the block as a stack of the components 34 to 52. With this arrangement, the patterns 32 and 54 form the exciting coil 22 of a little over three turns. The formation of the patterns 54 is also made by the evaporation or the spattering.

Figure 16:
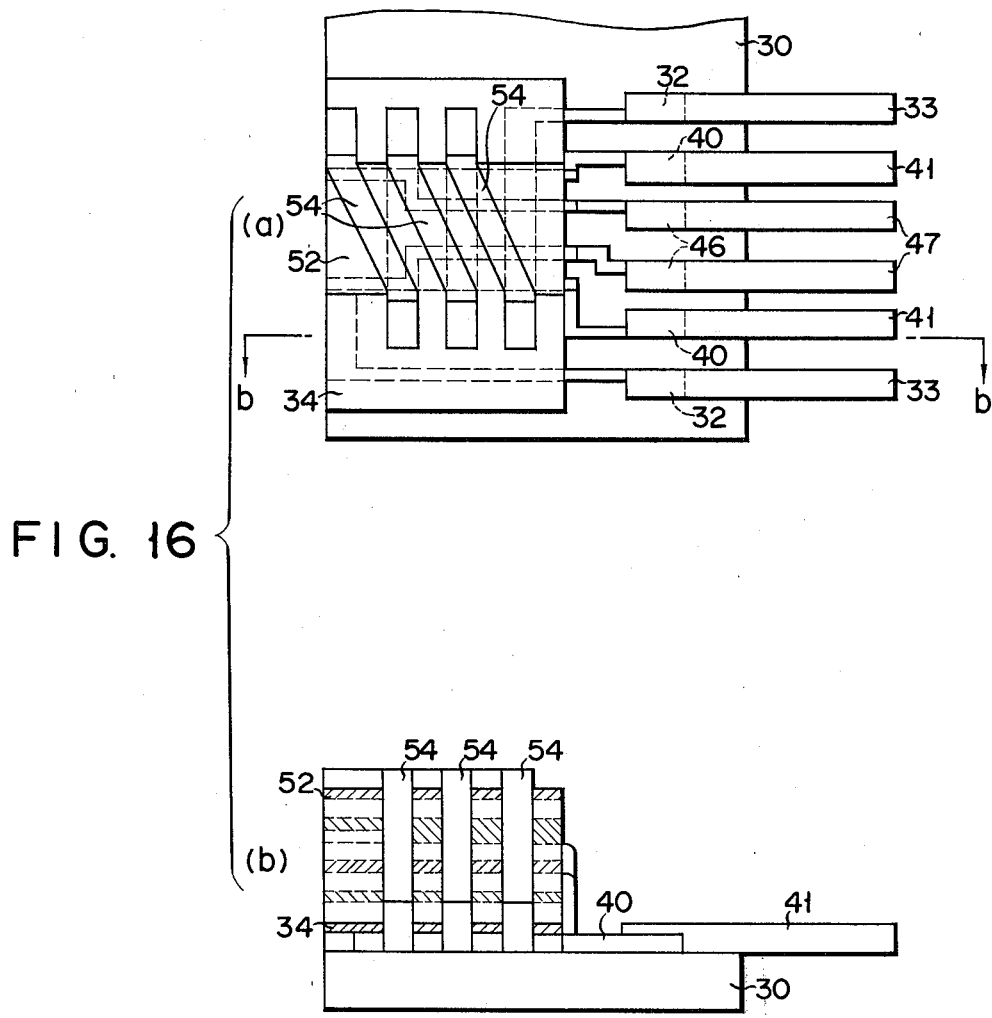

The step shown in FIG. 16 mounts the terminals 33, 41 and 47 to the patterns 32, 40 and 46, respectively. The terminal 33 serves as the terminal of the exciting coil 22; the terminal 41 as the terminal of the bias coil 40 (corresponding to the coil 16 in FIG. 1); the terminal 47 as the terminal for leading a reproduction signal from the MR element 44 (corresponding to the element 44 in FIG. 1).

Figure 17:
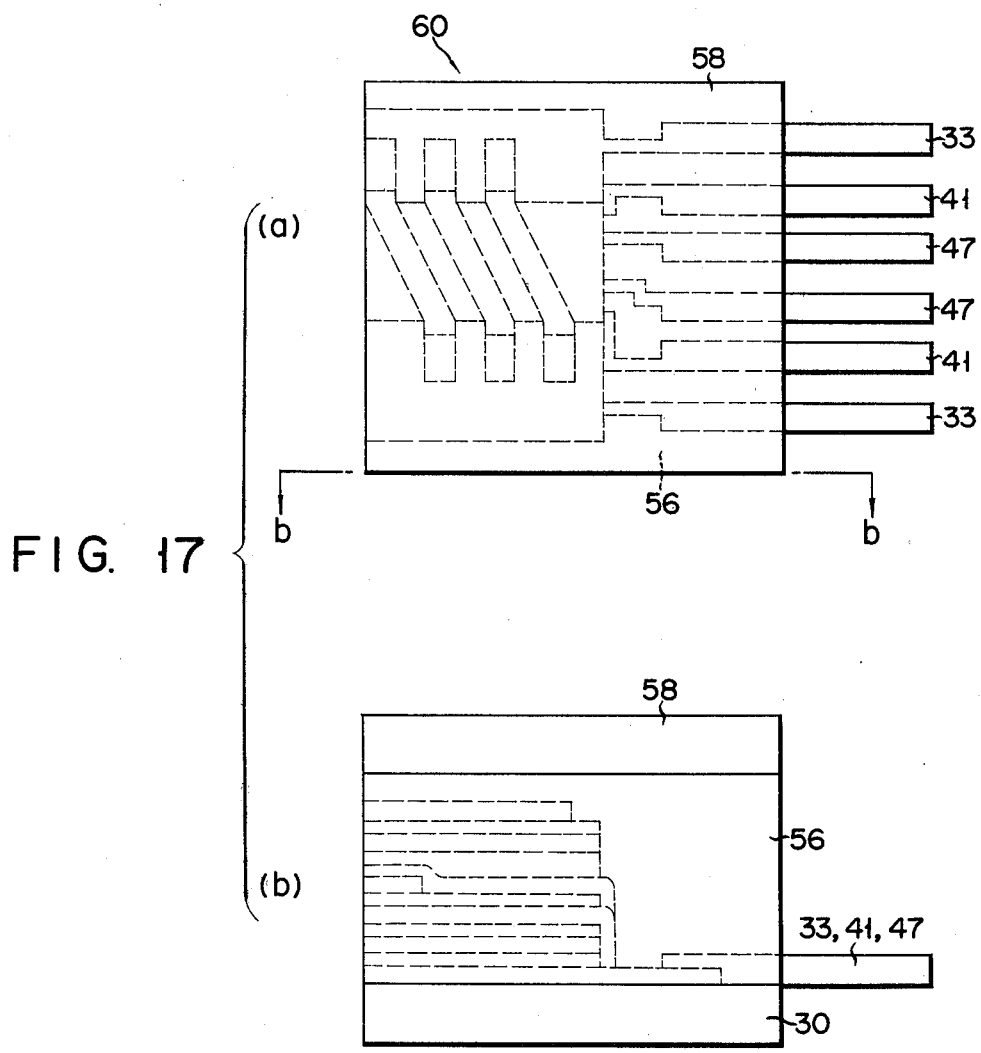

The step shown in FIG. 17 covers the components 32 to 54 with an insulation protective member 56 such as SiO2 and mounts a non-magnetic insulating plate 58. The sub-assembly thus formed is cut to have a block with a given size. In this way, a head block 60 is formed. The material of the insulating plate 58 may be the same as that of the substrate 30.

Figure 18:
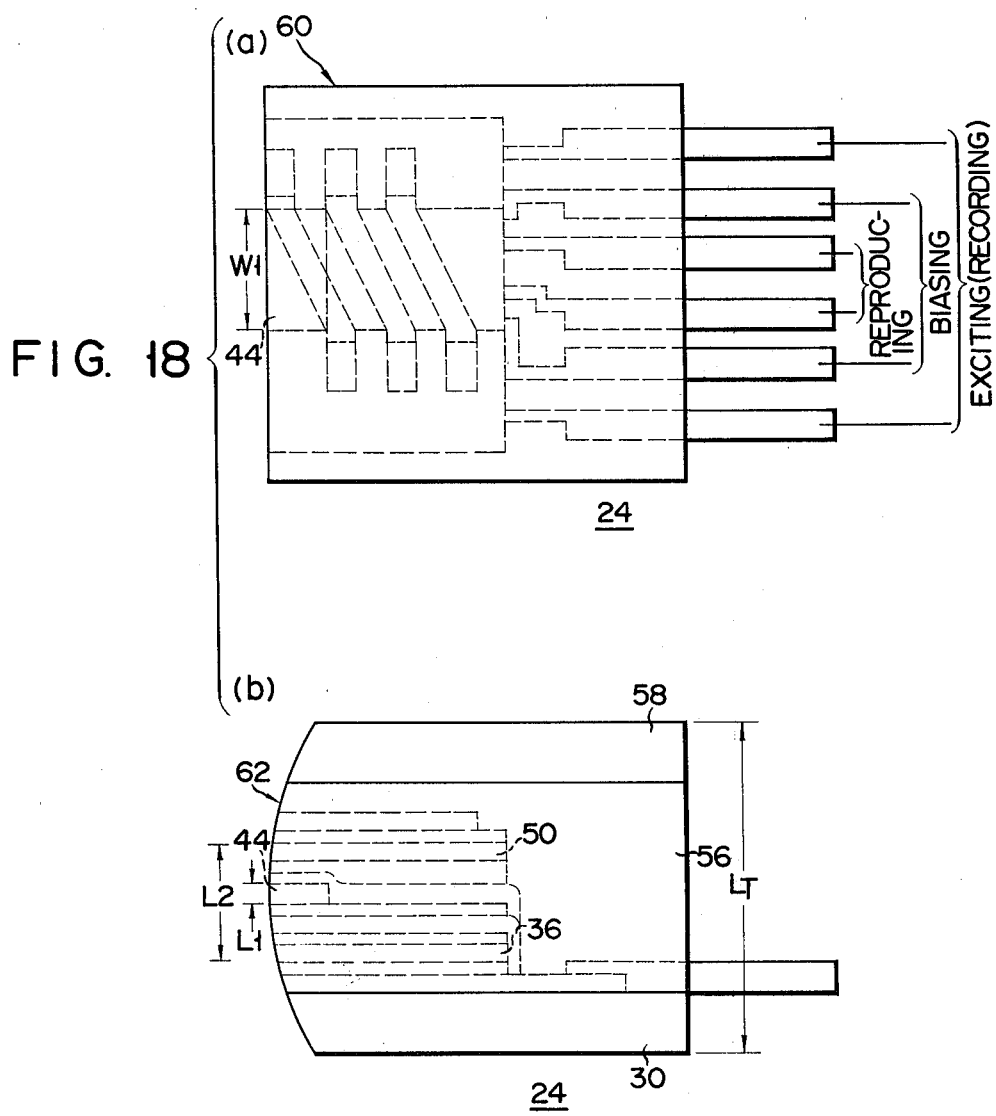

In a final step of the manufacturing process shown in FIG. 18, a tape sliding contact surface is lapped to have a proper shape. In this way, the main magnetic pole 24 of the record/reproduction head 26 is completed. As described above, the thickness L1 of the MR element 44 is 1 $\mu$m or less (for example, 0.3 $\mu$m) the interval L2 between the magnetic members 36 and 50 is a few or several $\mu$m (for example, 3 $\mu$m). The actual width $L_T$ of the main magnetic pole 24 is usually several mm or more. The width $L_T$ of the main magnetic pole 24 is almost determined by the thicknesses of the insulating plates 30 and 58. Therefore, the actual main magnetic pole 24 exhibits an appearance that the insulating plates 30 and 58 are jointed through the narrow SiO2 member 56.

The width W1 of the MR element 44 is determined in accordance with the magnetic tape used and the track construction. For example, the tape with the width of 6.3 mm is used as a single track tape, the width W1 of the MR element 44 is selected to be about 6 mm. When the tape with the width of 6.3 mm is used being divided into four tracks, the width W1 is approximately 1 mm.

Figure 19:
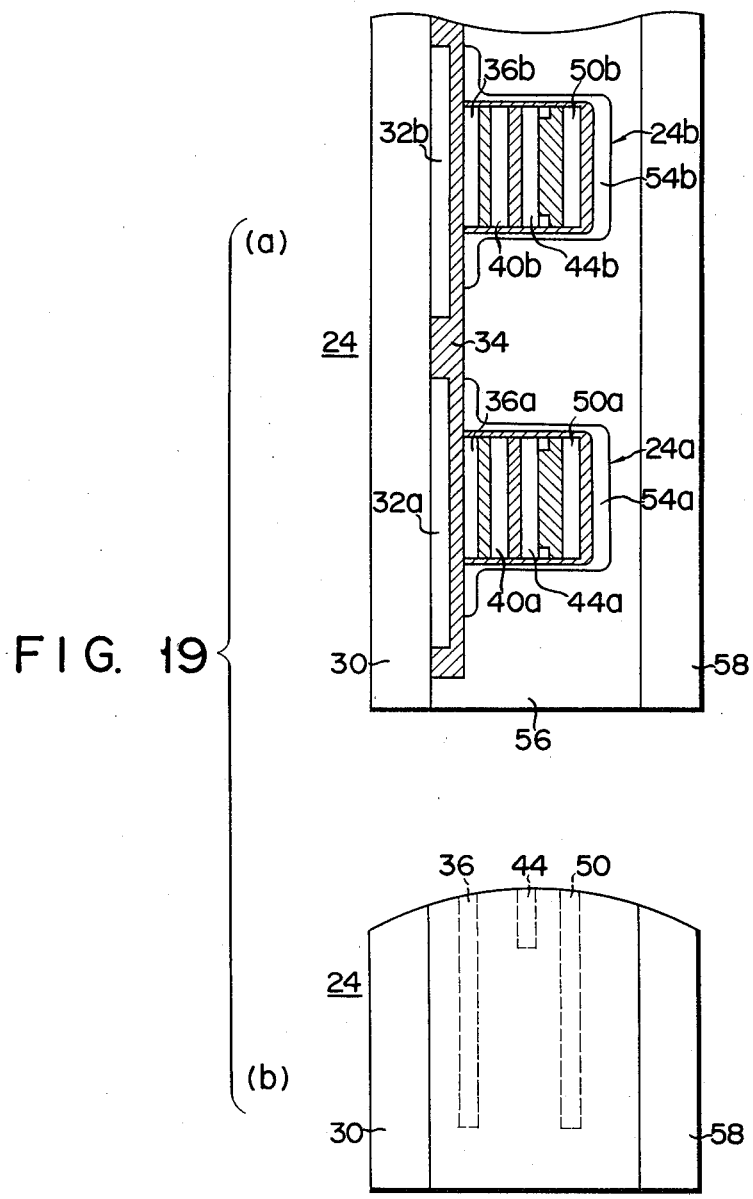
FIG. 19, consisting of (a) and (b), shows a cross sectional view of a multichannel head, which is manufactured by a similar process to that shown in FIGS. 4 to 18.

The description as given above relates to the manufacturing method of the record/reproduction head 26 of a single channel construction. If the manufacturing processes as mentioned above referring to FIGS. 4 through 18 are executed concurrently, the head of a multi-channel type may be manufactured in a similar manner to that of a single channel type head. FIG. 19 shows an example of the structure of multi-channel type main magnetic pole 24. In FIG. 19(a), magnetic members 36a and 50a, and an MR element 44a cooperate to form a main magnetic pole 24a of a channel A; and magnetic members 36b and 50b, and an MR element 44b cooperate to form a main magnetic pole 24b of a channel B.

The above-mentioned head 26 corresponds to the structure shown in FIG. 1. The auxiliary magnetic pole exciting head 26 as shown in FIG. 3 may be manufactured more easily. In this case, unnecessary is the step to form the SiO2 layers 34 and 52 for insulating the patterns 32, 54 of the exciting coil 22, and the terminal 33, and the patterns 32 and 54. Further, in the structure corresponding to that shown in FIG. 1, unless the exciting coil 22 is used, the main magnetic pole 24 corresponding to that shown in FIG. 3 is obtained. Additionally, by combining the main magnetic pole 24 with the structure as shown in FIG. 1 and the exciting type auxiliary magnetic pole 12 as shown in FIG. 3, information may be recorded by concurrently exciting both the main magnetic pole 24 and the auxiliary magnetic pole 12.

Figure 20:
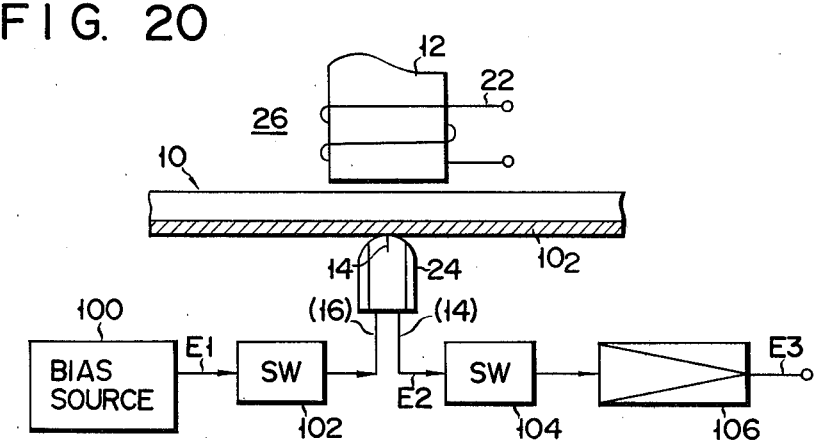
FIG. 20 is a block diagram of a device for recording and reproducing information by using the head 26 with the construction corresponding to that shown in FIG. 3.

Turning now to FIG. 20, there is shown a block diagram of a device for performing the record and reproduction of information by using the head 26 with the structure corresponding to that shown in FIG. 3. The reproduction mode follows. The bias signal E1 outputted from the bias power source 100 is supplied to the bias coil 16 of the main magnetic pole 24, through a first switch circuit 102. Upon this, the MR element 14 produces a reproduction output signal E2 corresponding to an amount of the magnetic flux developed from the magnetic tape 10. The signal E2 is inputted to a signal reproducing amplifier 106 through a second switch circuit 104. Then, the amplifier 106 produces a signal E3 representing the information recorded in the tape 10.

The record operation follows. In the record mode, the switch circuits 102 and 104 are in OFF state. The bias coil 16 is in open state and the output of the MR element 14 is not supplied to the amplifier 106. In this case, the magnetic members 18 and 20, and the MR element 14, receive a magnetic flux from the auxiliary magnetic pole 12, and they serve as the main magnetic pole to magnetize the magnetic medium $10_2$. Under this condition, when the recording current flows into the coil 22, the magnetic medium $10_2$ is subjected to a vertical magnetic record. The circuit shown in FIG. 20 is depicted omitting the record amplifier circuit for drive the exciting coil 22.

Figure 21:
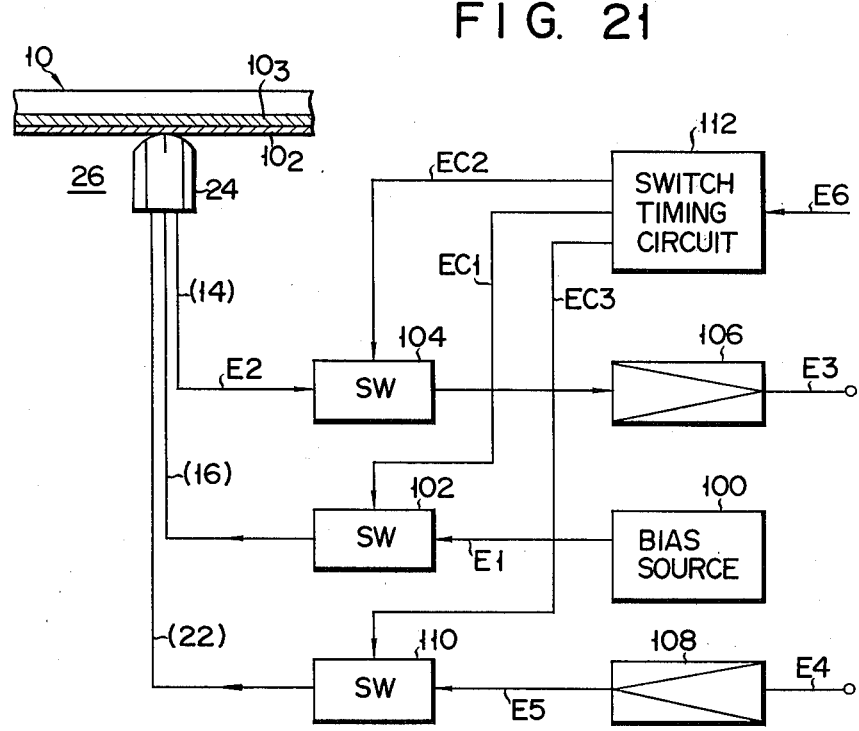
FIG. 21 is a block diagram of a device for recording and reproducing information by using the head 26 with the construction corresponding to that shown in FIG. 1.

FIG. 21 is a block diagram of a record/reproduction device for performing the record/reproduction by using the head 26 with the construction corresponding to that shown in FIG. 1. The bias signal E1 outputted from the bias power source 100 is supplied to the bias coil 16 of the main magnetic pole 24, through the first switch circuit 102. The reproduction output signal E2 provided from the MR element 14 is inputted to the reproducing amplifier 106 by way of the second switch circuit 104. As described above, the reproduction system shown in FIG. 21 has the same construction as that shown in FIG. 20; but the construction of the record system is different from the former. An input signal E4 to be recorded is amplified by the recording amplifier 108 to a signal E5. The signal E5 is applied to the exciting coil 22 in the main magnetic pole 24, through a third switch circuit 110.

The switch circuits 102, 104 and 110 are constructed by semiconductor switch circuits. The open and close, or ON and OFF, of these switch circuits are determined by ON/OFF control signals EC1, EC2 and EC3 outputted from a switch timing circuit 112. In the reproduction mode, the signal EC1 and EC2 are at high level while the signal EC3 is at low level. Under this level condition, only the switches 102 and 104 are in ON state, thereby to perform the reproduction operation. In the record mode, the signals EC1 and EC2 are at low level while the signal EC3 is at high level. As a result, only the switch circuit 110 is in ON state, thereby to perform the record operation.

Figure 22:
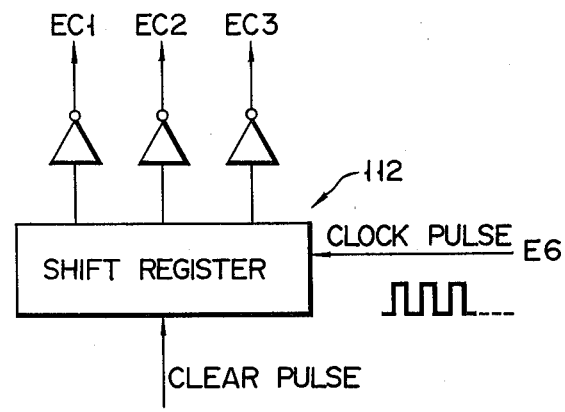
FIGS. 22 and 23 are block diagrams of the detailed constructions of the switch timing circuit 112 shown in FIG. 21.
Figure 23:
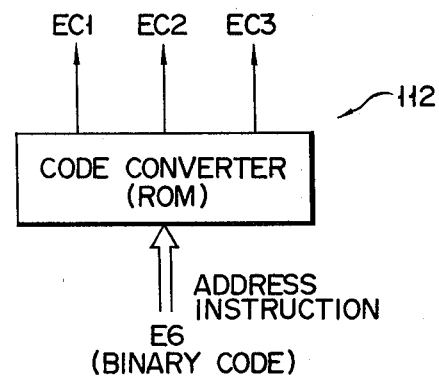

The switch timing circuit 112 may be assembled by a proper combination of gate or logic circuits. The logic levels of the signals EC1 to EC3 from the switch timing circuit 112 are determined depending on a switch signal E6 inputted. In other words, the head 26 is switched to perform the record or the reproduction in accordance with the signal E6. FIGS. 22 and 23 show examples of the circuit 112.

The head 26 of FIG. 21 is not provided with the auxiliary magnetic pole 12. When the magnetic medium used is comprised of the first layer $10_2$ with the anoisotropy of vertical magnetism and a second layer $10_3$ of a thin magnetic member with a low HC but a high $\mu$, for example, Fe-Ni, the high density recording is possible only by the main magnetic pole 24.

Although specific constructions have been illustrated and described herein, it is not intended that the invention be limited to the elements and constructions disclosed. One skilled in the art will recognize that other particular elements or subconstructions may be used without departing from the scope and spirit of the invention. For example, a permanent magnet may be used as a means for biasing the MR element 14. Although not preferable, either of the two magnetic members 18 and 20 which form the main magnetic pole in the record mode, may be omitted. The arrangement of the first to third switching circuits 102, 104 and 110 shown in FIG. 21 may be modified variously. The first switch circuit 102 may be a circuit for making the bias power source 100 per se active or inactive. The second switch circuit 104 may be provided at the output side of the amplifier 106. The head according to the invention is applicable for the vertical magnetic recording device of the rotatory head type, which is usually applied to VTR system. Besides the main magnetic pole of the in-line arrangement as shown in FIG. 19, it may employ a multi-channel head of a stagger arrangement in which the central positions of the main magnetic poles are dislocated from each other. When the magnetic members 36 and 50 are made of non-conductive material such as magnetic ferrite, the insulating layers 34, 38, 48 and 52 may be omitted.

What is claimed is:

1. A vertical magnetic recording and reproducing head comprising:
   magnetic sensing means for sensing a magnetic pattern recorded on a recording medium, said magnetic sensing means serving a main reproduction magnetic pole in a reproduction mode;
   bias means coupled to said magnetic sensing means for providing a bias to said magnetic sensing means; and
   main magnetic pole means comprising first and second magnetic members which are disposed adjacent to said magnetic sensing means, said magnetic sensing means being interposed between said first and second magnetic members, said main magnetic pole means serving as a main recording magnetic pole to magnetize said recording medium in a record mode.

2. A head of claim 1, wherein said main magnetic pole means further includes an exciting means to excite said first and second members, whereby said recording medium is magnetized on the basis of a recording magnetic field developed by said exciting means.

3. A head of claim 1, wherein said record/reproduction head further includes an auxiliary magnetic pole means disposed facing said main magnetic pole means, with said recording medium interposed therebetween.

4. A head of claim 2, wherein said record/reproduction head further includes an auxiliary magnetic pole means disposed facing said main magnetic pole means, with said recording medium interposed therebetween.

5. A head of claim 3, wherein said auxiliary magnetic pole means includes a second exciting means for exciting said auxiliary magnetic pole means, whereby said recording medium is magnetized on the basis of a recording magnetic field obtained when a magnetic flux developed by said second exciting means is applied to said main magnetic pole means.

6. A head of claim 4, wherein said auxiliary magnetic pole means includes a second exciting means for exciting said auxiliary magnetic pole means, whereby said recording medium is magnetized on the basis of a recording magnetic field obtained when a magnetic flux developed by said second exciting means is applied to said main magnetic pole means.

7. A vertical magnetic recording and reproducing system, comprising:

a head for sensing a magnetized pattern recorded on a recording medium, said head including a magnetic resistive element serving as a main reproduction magnetic pole in a reproduction mode of the system; a bias coil for applying a bias magnetic field to said magnetic resistive element; first and second magnetic members disposed on respective opposite sides of said magnetic resistive element; and an exciting coil for exciting said first and second magnetic members;

a signal output circuit coupled to said magnetic resistive element;

a first switch circuit coupled with said bias coil;

a second switch circuit coupled with said signal output circuit of said magnetic resistive element;

a third switch circuit coupled with said exciting coil; and a switch timing circuit for designating an operating state of each of said first, second and third switch circuits, said switch timing circuit operating only said first and second switch circuits when the system is in the reproduction mode, and, said switch timing circuit operating only said third switch circuit when the system is in a record mode.

8. A vertical magnetic recording and reproducing system comprising:

a head for sensing magnetized pattern recorded on a recording medium, said head including a magnetic resistive element serving as a main reproduction magnetic pole in a reproduction mode of the system; a bias coil for applying a bias magnetic field to said magnetic resistive element; a main magnetic pole means including first and second magnetic members disposed on respective opposite sides of said magnetic resistive element; an auxiliary magnetic pole disposed in opposition to said main magnetic pole with said recording medium being interposed therebetween; and an exciting coil for exciting said auxiliary magnetic pole;

a signal output circuit coupled to said magnetic resistive element;

a first switch circuit coupled with said bias coil;

a second switch circuit coupled with said signal output circuit of said magnetic resistive element;

a third switch circuit coupled with said exciting coil; and a switch timing circuit for designating an operating state of each of said first, second and third switch circuits, said switch timing circuit operating only said first and second switch circuits when said system is in the reproduction mode, and said switch timing circuit operating only said third switch circuit when the system is in a record mode.

* * * * *